Aug. 26, 1958   J. L. TENNANT, JR   2,848,842
PLANT CONTAINER WITH FIBROUS WALLS
HOLDING A ROOT GROWTH INHIBITOR
Filed June 28, 1955
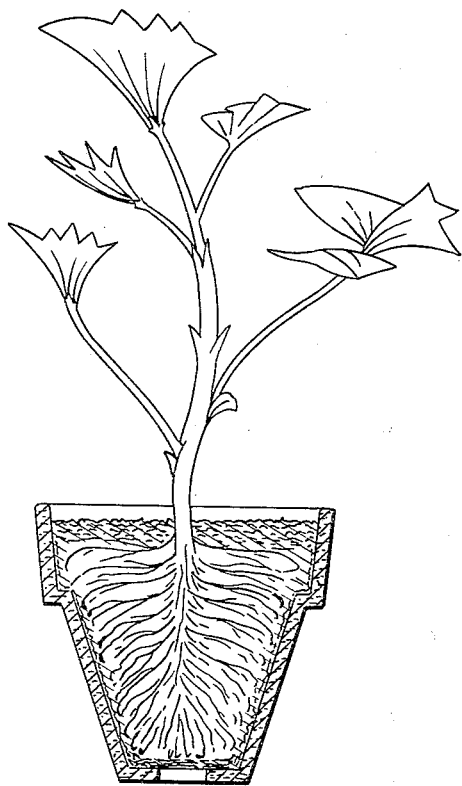
Inventor,
James L. Tennant, Jr.

United States Patent Office 2,848,842
Patented Aug. 26, 1958

2,848,842

PLANT CONTAINER WITH FIBROUS WALLS HOLDING A ROOT GROWTH INHIBITOR

James L. Tennant, Jr., Medfield, Mass., assignor to Bird & Son, inc., East Walpole, Mass., a corporation of Massachusetts Application June 28, 1955, Serial No. 519,258

10 Claims. (Cl. 47—34)

This invention relates to a plant container having a fibrous wall structure holding a root growth inhibitor chemical and pertains more specifically to fibrous containers which are so constructed as to be capable of repeated in use.

One object of the invention is to provide a fibrous plant container such as a plant pot, flower pot, or the like capable of repeated use and which is suitable for growing, shipping and retail selling of living plants.

Another object is to provide a fibrous plant container which is impermeable to plant roots and, moreover, to provide a fibrous plant container in which the plant root growth is so controlled and directed as to substantially eliminate risk of the plant becoming pot-bound even when the plant is grown in the container for extended periods of time.

Still another object is to provide a fibrous plant container in which the fibrous wall is permeable to water, has a high wet-strength, and while impermeable to penetration by plant roots exercises no retarding or other undesired effect upon the development of growing plants.

Other and further objects will be apparent from the following description.

It has hitherto been proposed to provide plant containers or plant pots having fibrous wall structures. However, all of such containers previously known have suffered from the disadvantage that if made sufficiently permeable to permit passage of water or moisture through the wall structure, they have also been subject to ready penetration by the roots of any plant grown therein, so that if the plant is withdrawn from the pot or container for transplanting substantial damage to the root structure has occurred, causing excessive shock to the plant and resulting in an undesirably low survival rate after transplantation. On the other hand, if plants grown in such containers are allowed to remain therein, the container being buried in the earth along with the plant, the walls of the container have rapidly been deteriorated and/or penetrated by roots due to continuing growth of the plant, so that such containers have been suitable for only a single use. It has also been proposed to impregnate or coat the walls of such fibrous plant containers with binder materials so as to decrease or even completely eliminate their water-permeability. Though such expedient has prevented penetration of the wall structure by the roots of the plant and has made the containers capable of more than a single use, they have suffered from the serious disadvantage that plants grown in containers so constructed tend to become rapidly pot-bound by reason of the excessive intertangling and intermatting of the plant roots when they reach the wall of the pot, just as in the case of clay pots.

The plant containers of this invention have fibrous wall structures, preferably comprising water-laid cellulosic fibers such as paper making fibers. They may be made from a fibrous paper making furnish by conventional pulp molding process or they may be assembled or fabricated from sheets of paper, chip board, cardboard, or other fibrous sheet material cut to the desired pattern. The fibrous wall structure preferably contains a binder and/or a coating comprising asphalt, pitches, natural or synthetic rubber, resinous materials such as melamine formaldehyde, urea formaldehyde, phenol formaldehyde, polyvinyl or other resinous material, in order to provide sufficient wet-strength. The binder may be incorporated in conventional manner, as is preferred, in the form of an aqueous dispersion added to the fibrous pulp furnish or may be later applied as by brushing, dipping, spraying, etc., to the finished sheet material or molded container in the form of a hot melt or a solution in a suitable organic solvent. The quantity of the binder may be so limited and incorporated as to provide a finished container having a wall structure which is permeable to water, and preferably also air-permeable, or by increasing the amount, a wall structure impervious to water may be provided. Preferably the wall structure is permeable to water and moisture and possesses sufficient wet-strength so that it does not soften excessively when exposed to moist soil or other growing media. The shape of the container may take any desired form, such as a rectangular or truncated conical shape. The finished containers are light in weight, being only about one-twentieth as heavy as clay pots of the same size, have a high strength-weight ratio, and exhibit remarkably little softening or discoloration in use.

In the drawing there is shown in vertical section one embodiment of the invention together with a plant grown therein.

In order to prevent penetration of the wall structure of the plant containers of the present invention in the case where the walls are water and/or air permeable in nature, thus preserving the container for repeated use, and also to prevent plants from becoming pot-bound in the case where the walls are impermeable in nature, there is provided in the wall structure of my novel containers a substantially water-insoluble chemical root growth inhibitor. This inhibitor material, which may be any one or more of a number of different well-known chemical compositions, may be introduced into the wall structure in the same manner as the binder material and either before or after application of the binder, preferably simultaneously with the binder. When the inhibitor material is added prior to or simultaneously with the binder, the latter aids in holding the inhibitor material in place in the fibrous wall structure without detracting from its effectiveness. The inhibitor material may be applied to the fibrous wall structure in the form of an aqueous dispersion or as a solution in a suitable solvent. When the binder material is added to an aqueous fiber furnish or slurry, it is convenient in some cases to employ an aqueous solution of a soluble form of the inhibitor material, or to dissolve the soluble form directly in the aqueous furnish, then convert it to relatively water-insoluble form by chemical reaction or precipitation directly upon the fibers. The chemical inhibitor, because of its relative insolubility in water, may be incorporated in fibrous containers the walls of which contain no binder at all, but it is preferred to employ the chemical inhibitor material in conjunction with a binder. The chemical inhibitor material preferably has at most a very low solubility in water, such that it is not readily leached out of the wall structure during use, thus permitting the containing to be used repeatedly for growing succesive new plants without the necessity for fresh application of the inhibitor material. For the same reason, the inhibitor material is essentially non-volatile at room temperature.

The chemical root growth inhibitor has the effect not only of substantially preventing penetration of the wall structure by the plant roots when the material is employed in conjunction with a permeable fibrous wall structure, but in addition it produces the remarkable result of causing the plant roots to turn away from the wall in most cases before they come in contact with it, as shown in the drawing. It is observed in many cases that the plants, upon removal from the container, exhibit a different type of root disposition from that which occurs when plants are grown in containers having walls which are permeable to roots or even in containers such as clay pots which are impermeable to roots. In general and typically, almost no roots are visible on the outside of the root ball in the case of plants grown in the containers of the present invention. However, upon removal of a thin external layer of dirt, of the order of 1/16–1/8 inch thick, from the root ball, a very effective root structure containing sturdy plant roots will be found. In addition, plants grown in the present containers do not exhibit any symptoms of pot-binding even when grown in the containers for periods much longer than are normally desirable. The roots are not entwined and entangled around the outside of the root ball, as is normally the case when plants are grown in containers having root-impermeable wall structures, and after transplanting they exhibit little or no transplanting shock and grow very rapidly into the surrounding soil, thus giving excellent plant development.

Among the essential water-insoluble and non-volatile chemical root inhibitor materials which have been found to be effective are the water-insoluble hydroxyaromatic compounds, particularly the copper salt of phenol; the polyhalophenols, particularly the polychlorophenols such as trichloro-, tetrachloro-, and pentachlorophenol and their water-insoluble metal salts, such as copper or zinc salts; the copper salt of 8-hydroxyquinoline; and dinitro-o-sec-butyl-phenol. Also highly effective are the water-insoluble 2,4,5-trichlorophenoxyacetic acid propylene glycol butyl ether ester (sold commercially as Esteron 245, Dow Chemical Company); and water-insoluble metal salts such as the zinc salt of a mixture of dimethyldithiocarbamic acid and 2-mercaptobenzothiazole (sold commercially as Vancide 51, R. T. Vanderbilt Co.). If desired, various nutrients, fertilizers, hormones, etc., may also be incorporated in the wall structure to stimulate and improve plant growth, but form no part of the present invention.

The presence of the chemical root inhibitor material in the wall structure surprisingly has been found to have no harmful effects upon plants grown in such containers, and there has been no evidence of any stunting of plant growth in the numerous trials which have been made, which is truly remarkable in view of the fact that all the materials effective as chemical root growth inhibitors belong to the class of compounds toxic to plant life. In fact, many of these compounds are used commercially to destroy plant life.

Referring again to the manufacture of the plant containers of this invention, the proportions of binder material which may be employed may vary over a wide range depending upon the particular binder employed and the manner in which it is applied, as well as the degree of water impermeability which is desired. When employing asphalt as the preferred binder material in the form of an aqueous dispersion which is added to the fibrous furnish, it has been found that 5%–20% by weight of the asphalt based upon the weight of the fibrous material gives excellent results, and the other wet strengthening binder materials may be used in proportions which are of the same order of magnitude. The proportions of water-insoluble chemical growth inhibitor material employed also may vary over a considerable range, and it has been found that such material is highly effective for my purpose even when employed in extremely small quantities, as low as 0.05% of the dry weight of the fibrous material. Larger proportions may be employed up to 2% by weight or even more, but there is no advantage in employing larger quantities of the material, since this increases the cost of my containers without providing corresponding improvement in effectiveness.

If desired, any conventional dyes or other coloring materials may be employed and may be either incorporated in the pulp furnish or may be applied to the finished container or to the sheet material from which a container is fabricated.

The following specific examples are intended to illustrate more clearly the nature of the invention without restricting its scope. In the examples, the term "parts" means "parts by weight."

*Example 1*

A pulp furnish was prepared by repulping 400 parts by weight of old newspapers in 23,000 parts by weight of water. The pH was raised to 7.5–8.0 with sodium hydroxide followed by the addition of 37 parts of an aqueous dispersion containing 20 parts by weight of asphalt and 1.56 parts by weight of sodium pentachlorophenate. After mixing the dispersion thoroughly into the furnish, the pH was lowered to pH 5.0 by the addition of copper sulfate, thus serving to convert the water-soluble sodium pentachlorophenate to the water-insoluble copper pentachlorophenate. In order to provide an attractive color, 2 parts by weight of a direct red dye were also added to the stock, and it was then molded into plant containers of a conventional truncated conical shape provided with a drainage outlet in the bottom, the molding process being a conventional pulp molding process.

Containers thus fabricated were employed for growing several varieties of plants including tomato, chrysanthemum, philodendron, marigold, geranium, aster, alyssum, ivy, cactus, and begonia, and were found to give satisfactory service without any apparent deterioration in effectiveness upon repeated use for more than two years. No penetration of the wall structure by plant roots was observed, although the wall structures were permeable to water and moisture. All of the plants grown in such containers were found to be remarkably free from pot-binding even though grown for periods much longer than is considered desirable in clay or other root-impermeable containers of the same size. None of the plants exhibited any indication of retarded or stunted growth.

*Example 2*

A pulp furnish was prepared as described in Example 1 by repulping old newspapers and the pH was raised to 9.5 with sodium hydroxide. To the furnish was added 0.6 part by weight of symmetrical di-beta-naphthyl-p-phenylene diamine and 3.0 parts of zinc oxide with thorough mixing. There were then added 400 parts by weight of a 5% total solids neoprene latex (Type 735), a synthetic rubbery polymer of chloroprene. The p-phenylene diamine and the zinc oxide served as compounding ingredients for the neoprene rubber. After thorough mixing of the latex with the furnish, there were added 2.6 parts by weight of sodium pentachlorophenate which was likewise mixed into the dispersion. The stock was then acidified to a pH of 4.5 by the addition of paper makers' alum, thus converting the water-soluble sodium pentachlorophenate into the water-insoluble pentachlorophenol. About 1 part of direct red dye was also added. The stock was then molded into plant containers by a conventional pulp molding process as described in Example 1.

The containers thus prepared gave results substantially identical with those obtained in the case of the containers prepared as described in Example 1.

*Example 3*

A furnish was prepared by repulping old newspapers as described in Example 1 and the pH was raised to 7.5–8.0 by the addition of sodium hydroxide. To the alkaline dispersion were added 148 parts of an aqueous dispersion containing 80 parts of asphalt (known as Bitusize B) and 2.6 parts of sodium pentachlorophenate with thorough stirring. After the ingredients were thoroughly dispersed, the mix was acidified by reducing the pH to 4.5 by means of paper makers' alum, thus insolubilizing the sodium pentachlorophenate by converting it into pentachlorophenol. This mix was employed for molding containers as described in Example 1 above with substantially the same results.

Molded pulp containers were also prepared in the same manner as above except that the sodium pentachlorophenate was omitted.

Both sets of containers were grow-tested for 3 to 4 months with geraniums and philodendron. Containers made with the pentachlorophenol were not penetrated by plant roots during the entire growing period. The plants could be readily removed from the containers and could be transplanted without plant shock. The containers were suitable for re-use. The containers with no pentachlorophenol were penetrated by plant roots within a few weeks. Plants in these containers could not be removed without extensive root damage and consequent plant shock. Removal of the plant damaged and distorted the containers making them unfit for re-use.

The above example illustrates the effectiveness of the chemical root growth inhibitor. It was able to physiologically restrain root penetration. In the absence of this agent, the physical characteristics of the container were unable to do this.

*Example 4*

A furnish was prepared as described in Example 2 and an asphalt dispersion and sodium pentachlorophenate were added as described in Example 3, except that 2.31 parts by weight of sodium pentachlorophenate were employed. A sufficient quantity of aqueous zinc sulfate was then added to reduce the pH to 4.5 and convert the sodium pentachlorophenate into the water-insoluble zinc pentachlorophenate. After molding the stock into containers, they were found to give substantially the same results as described for the containers of Example 1.

*Example 5*

A highly sized chipboard sheet was treated with a calender coating of a solution of sodium pentachlorophenate. Excess alum in the chipboard converted the sodium pentachlorophenate to the pentachlorophenol, rendering it no longer soluble in water. Analysis of the resulting sheet showed a retention of 0.064% pentachlorophenol. Rectangular plant containers or bands prepared from this chipboard were used to contain growing tomato and squash plants. Excellent growth characteristics were obtanied with both types of plants without any penetration of the containers by plant roots.

*Example 6*

A furnish was prepared by repulping old newspapers as described in Example 1. The pH was raised to 7.5–8.0 by the addition of sodium hydroxide. To the alkaline dispersion was added 148 parts of an aqueous dispersion containing 80 parts of asphalt and 3.02 parts of phenol dissolved in a dilute sodium hydroxide solution. After the ingredients were thoroughly mixed, the mix was acidified to pH 4.5 by means of copper sulfate addition, thus insolubilizing the phenol by converting it to the copper salt. The stock was molded into containers. These were found to give substantially the same results as described for the containers of Example 1.

*Example 7*

A furnish was prepared as described in Example 1, and to it was added 148 parts of an asphalt dispersion containing 80 parts of asphalt. Then 4 parts (active ingredient basis) of a mixture of dimethyldithiocarbamic acid and 2-mercaptobenzothiazole, known commercially as Vancide 51 (R. T. Vanderbilt Co.) was added. The pH was lowered to 4.5 with zinc sulfate, thus insolubilizing the above mixture by conversion to the zinc salts. After molding the stock into containers, they were found to give substantially the same results as described for the containers of Example 1.

*Example 8*

A furnish was prepared as described in Example 1, and to it was added 148 parts of an asphalt dispersion containing 80 parts of asphalt. Then 3.3 parts of 8-hydroxyquinoline was also added. The pH was lowered to 4.5 with copper sulfate, thereby converting the 8-hydroxyquinoline to the insoluble copper-8-quinolinolate. The stock was molded into containers. These were found to give substantially the same results as described for the containers in Example 1.

*Example 9*

A furnish was prepared as described in Example 1, and to it was added 148 parts of an asphalt dispersion containing 80 parts of asphalt together with 2 parts (active ingredient basis) 2,4,5-trichlorophenoxy acetic acid propylene glycol butyl ether esters (known commercially as Esteron 245, Dow Chemical Company). The pH was lowered to 4.5 with paper makers' alum. The stock was molded into containers. These were found to give substantially the same results as described for the containers in Example 1.

*Example 10*

A furnish was prepared as described in Example 1, and to it was added 148 parts of an asphalt dispersion, along with 2.0 parts dinitro-o-sec-butylphenol. The pH was lowered to 4.5 with paper makers' alum. The stock was molded into containers. These were found to give substantially the same results as described for the containers in Example 1.

Similar results are obtained by fabricating containers from fibrous sheet material prepared from stock mixes as described in the specific examples.

Although specific embodiments of the invention have been described herein, it is not intended to limit the invention solely thereto, but to include all of the obvious variations and modifications within the spirit and scope of the appended claims.

This application is a continuation in part of my co-pending application Serial No. 446,977, filed July 30, 1954, now abandoned.

I claim:

1. A plant container having a water-laid cellulosic fibrous wall structure including a substantially water-insoluble non-volatile chemical root growth inhibitor, said wall structure being permeable to root growth in the absence of said inhibitor, said inhibitor substantially inhibiting plant root growth at a distance of $\frac{1}{16}$ to $\frac{1}{8}$ inch from said wall structure without stunting the plant and being selected from the class consisting of hydroxyaromatic compounds; metal salts thereof; 2,4,5-trichlorophenoxyacetic acid propylene glycol butyl ether ester; and metal salts of a mixture of dimethyldithiocarbamic acid and 2-mercapto-benzothiazole.

2. A plant container as defined in claim 1 in which said wall structure is impregnated with a binder.

3. A plant container as defined in claim 2 in which said binder comprises asphalt.

4. A plant container as defined in claim 1 in which said inhibitor is a substantially water-insoluble non-volatile hydroxyaromatic compound.

5. A plant container as defined in claim 1 in which said inhibitor is a substantially water-insoluble non-volatile metal salt of a hydroxy-aromatic compound.

6. A plant container as defined in claim 1 in which said inhibitor comprises a substantially water-insoluble non-volatile polyhalophenol.

7. A plant container as defined in claim 1 in which said inhibitor comprises a substantially water-insoluble non-volatile metal salt of a polyhalophenol.

8. A plant container as defined in claim 1 in which said inhibitor comprises a substantially water-insoluble non-volatile metal salt of 8-hydroxyquinoline.

9. A plant container as defined in claim 1 in which said inhibitor comprises substantially water-insoluble non-volatile 2,4,5-trichlorophenoxyacetic acid propylene glycol butyl ether ester.

10. A plant container as defined in claim 1 in which said inhibitor comprises substantially water-insoluble non-volatile metal salt of a mixture of dimethyldithiocarbamic acid and 2-mercaptobenzothiazole.

References Cited in the file of this patent

UNITED STATES PATENTS

| | | |
|---|---|---|
| 2,188,734 | Carswell | Jan. 30, 1940 |
| 2,189,889 | Engel | Feb. 13, 1940 |
| 2,688,209 | Adams | Sept. 7, 1954 |
| 2,728,169 | Spengler | Dec. 27, 1955 |